US011979726B2

(12) United States Patent
Afresne et al.

(10) Patent No.: US 11,979,726 B2
(45) Date of Patent: May 7, 2024

(54) SPEAKER DRIVER WITH TWO OPPOSITE MAGNETS

(71) Applicant: DEVIALET, Paris (FR)

(72) Inventors: Jean-Loup Afresne, Saint Clément les Places (FR); Fabrice Marteau, Gif sur Yvette (FR)

(73) Assignee: DEVIALET, Paris (FR)

( * ) Notice: Subject to any disclaimer, the term of this patent is extended or adjusted under 35 U.S.C. 154(b) by 190 days.

(21) Appl. No.: 17/826,897

(22) Filed: May 27, 2022

(65) Prior Publication Data

US 2022/0386032 A1 Dec. 1, 2022

(30) Foreign Application Priority Data

May 31, 2021 (FR) ..................................... 21 05683

(51) Int. Cl.
*H04R 9/02* (2006.01)
*H04R 9/04* (2006.01)
*H04R 9/06* (2006.01)

(52) U.S. Cl.
CPC ............. *H04R 9/025* (2013.01); *H04R 9/045* (2013.01); *H04R 9/06* (2013.01); *H04R 2400/11* (2013.01)

(58) Field of Classification Search
CPC .......... H04R 9/025; H04R 9/045; H04R 9/06; H04R 9/043; H04R 9/04; H04R 9/027; H04R 2400/11
See application file for complete search history.

(56) References Cited

U.S. PATENT DOCUMENTS

| | | | |
|---|---|---|---|
| 7,065,225 | B2 | 6/2006 | Stiles |
| 9,774,957 | B2 | 9/2017 | Zhang |
| 2010/0296689 | A1 | 11/2010 | Pircaro |
| 2010/0316249 | A1 | 12/2010 | Kamimura et al. |

FOREIGN PATENT DOCUMENTS

| | | |
|---|---|---|
| WO | WO 99/31931 | 6/1999 |

OTHER PUBLICATIONS

Preliminary Search Report for FR 2105683 dated Feb. 18, 2022.

*Primary Examiner* — Tuan D Nguyen

(74) *Attorney, Agent, or Firm* — B. Aaron Schulman, Esq.; Stites & Harbison, PLLC

(57) ABSTRACT

The speaker comprises a magnetic circuit. The speaker comprises mobile equipment that is movable relative to the magnetic circuit. The spool holder is mounted movably through air gaps and a guide element of the mobile equipment is arranged between the mobile equipment and a frame, on the side of a membrane relative to the magnetic circuit. The mobile equipment passes all the way through the magnetic circuit through end air gaps. The speaker includes a complementary guide element, arranged between the mobile equipment and the frame, on the side opposite the membrane relative to the magnetic circuit.

10 Claims, 4 Drawing Sheets

SPEAKER DRIVER WITH TWO OPPOSITE MAGNETS

The present invention relates to a speaker comprising a frame comprising a magnetic circuit having on the one hand an external metal casing that is toroidal about an axis and on the other hand a stack comprising a metallic central core placed between a first magnet and a second magnet, with polarities of opposite directions along the axis, aligned along this same axis and themselves placed between a first metal disc and a second metal disc, the central core and at least one disc delimiting an air gap with the casing, the speaker comprising mobile equipment that is movable relative to the magnetic circuit along the axis, the mobile equipment including a spool holder bearing a spool and a membrane, the spool holder being mounted movably through the air gaps, the speaker including a first guide element of the mobile equipment arranged between the mobile equipment and the frame on the side of the membrane relative to the magnetic circuit.

Document U.S. Pat. No. 7,065,225 B2 describes a speaker including a magnetic circuit comprising two magnets of coaxial polarities and opposite directions and a central core placed between the two magnets, which are themselves placed between, on the one hand, a metal disc, and on the other hand, a yoke formed by an exterior casing in the form of a shell closed at one end by a metal disc. The yoke surrounds the magnets, the central core and the metal disc, thus closing the magnetic circuit.

A spool is secured to a spool holder that is connected to the membrane, thus forming mobile equipment movable through the magnetic circuit. The spool surrounds the central core and is in turn surrounded by the yoke, such that the spool passes through the magnetic circuit in an annular air gap. A first guide element of the mobile equipment, commonly called suspension, connects the membrane to a flared case commonly called basket assembly. A second guide element, of the wave seal type commonly called "spider," connects the spool holder to the same flared case. The first and second guide elements are placed on the same side of the magnetic circuit.

The problem related to such holding of the spool holder is insufficient translational guiding of the spool holder.

The aim of this invention is to propose a speaker that allows improved guiding of the spool holder.

To this end, the invention relates to a speaker of the aforementioned type, characterized in that each metal disc delimits, with the casing, an end air gap, the mobile equipment passes all the way through the magnetic circuit through the end air gaps and the speaker includes an additional guide element, arranged between the mobile equipment and the frame, on the side opposite the membrane relative to the magnetic circuit.

The speaker according to the invention has a significant axial gap between the guide elements that are arranged on either side of the magnetic circuit, improving the translational guiding of the mobile equipment.

According to other advantageous aspects of the invention, the speaker includes one or more of the following features, considered alone or according to all technically possible combinations:

- the spool comprises a central winding section and two end winding sections, the end winding sections extending at rest each at least partially through an end air gap,
- when the central winding section is aligned with the central air gap, the end winding sections being offset from the end air gaps at a distance from the central core,

- a protective cap secured to the metal casing and which surrounds the complementary guide element,
- a central pillar extending the stack on the side opposite the membrane, the complementary guide element being connected to the central pillar,
- the mobile equipment includes, at its end opposite the membrane, a divergent, the section of which increases at its end opposite the membrane, the complementary guide element being connected to the end of large diameter of the divergent,
- the metal casing includes a first shell and a second shell, which are coaxial, arranged end to end in the extension of one another,
- the spool is extended by lead wires circulating through air gaps delimited by the two metal discs, and
- the inner diameter of the casing along any plane perpendicular to the axis is smaller at its two ends than in its central region.

The invention further relates to an audio device, comprising a speaker as defined above.

The invention will be better understood upon reading the following description, provided solely as a non-limiting example and done in reference to the appended drawings, in which.

Figure 1:
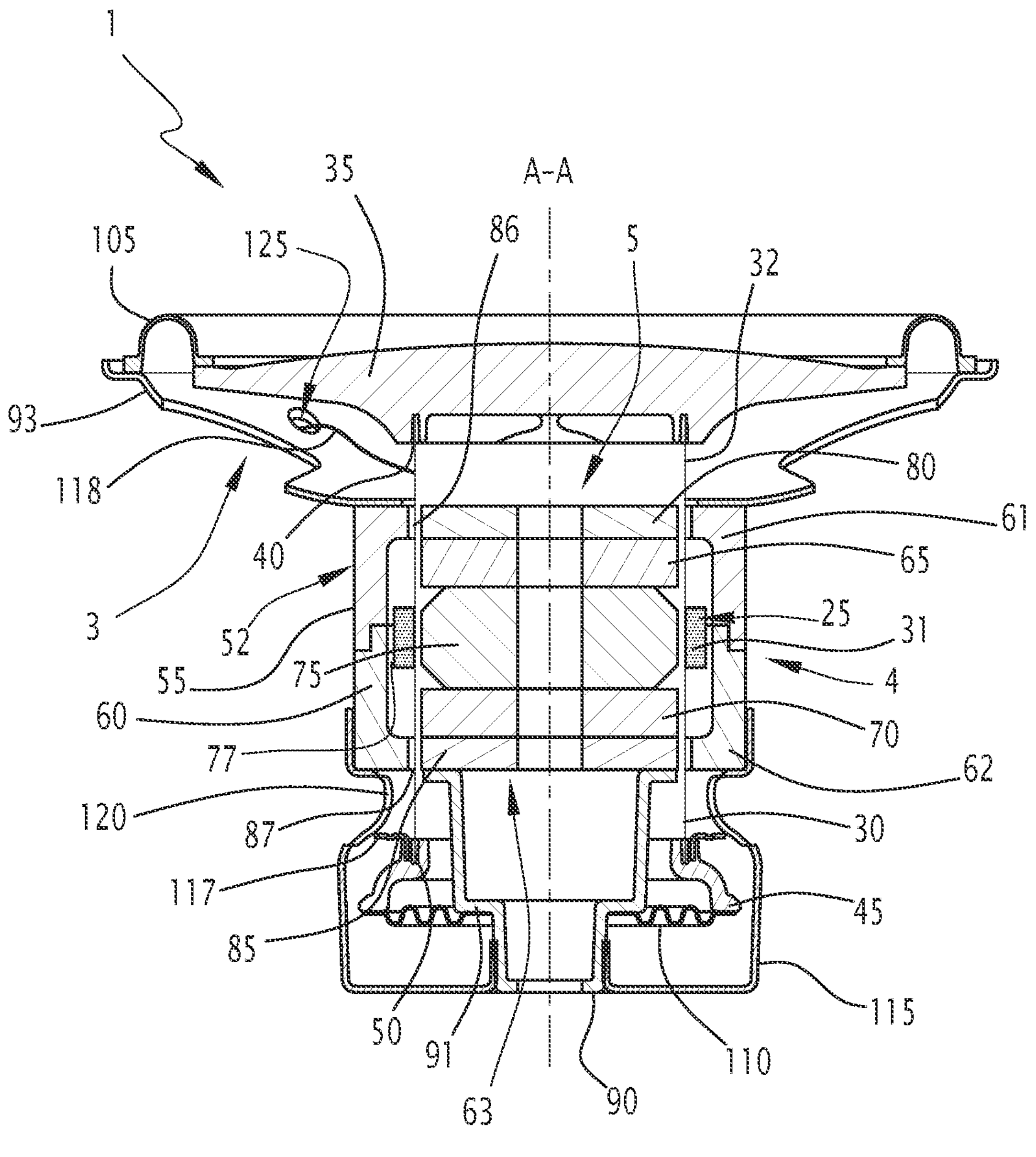
FIG. 1 is a partial sectional view of a speaker according to a first embodiment of the invention.

The speaker 1 includes a frame 3 including a magnetic circuit 4, and mobile equipment 5 movable by sliding relative to the frame 3 along an axis A-A.

The mobile equipment 5 includes a spool 25 secured to a spool holder of revolution 30. The spool holder 30 is oriented along an axis A-A.

In the embodiment of FIG. 1, the spool 25 comprises only a central winding section 31. The central winding section 31 is formed by a winding of at least one contact line, wound around the spool holder 30 and distributed over one or several layers.

The spool holder 30 comprises a main tubular body 32, one end of which is attached to a membrane 35. The membrane 35 is for example made from injected plastic. The membrane 35 comprises a groove 40. The main tubular body 32 of the spool holder is embedded in the groove 40 of the membrane. The spool holder 30 is for example glued to the membrane 35 in the groove 40.

In the embodiment illustrated in FIG. 1, the mobile equipment 5 comprises a divergent 45 extending the tubular main body 32 of the spool holder at its other end. The divergent has a shape of revolution of axis A-A. The divergent 45 is for example formed from injected plastic. It comprises a groove 50, and the main tubular body 32 of the spool holder is embedded in the groove 50. The spool holder body 30 is for example glued to the divergent 45 in the divergent groove 50. The free end of the divergent 45 opposite its connecting end to the main body 32 is wider than the end of the main body 32.

The magnetic circuit 4 includes a cylindrical metal casing of axis A-A denoted 52 made up of a first metal shell 55 on the side of the membrane 35 and a second metal shell 60 on the side opposite the membrane 35. The two shells 55, 60 are connected along a peripheral shoulder.

In the embodiment illustrated in FIG. 1, the two shells 55, 60 have, at their ends opposite their shoulders, an inner collar 61, 62 reducing their inner diameter. An inner spot facing is thus arranged for housing the central winding section 31. The inner diameter of the casing 52 is thus smaller at its two ends than in its central region.

The magnetic circuit further includes a stack 63, of axis A-A, placed inside the volume formed by the casing 52.

The stack 63 includes two magnets 65, 70 both in disc form. An aperture passes through the two magnets 65, 70, for example along the axis A-A. The disc form of the two magnets is then more particularly, according to this embodiment, a ring shape. In a variant that is not shown, the disc form of the two magnets 65, 70 is a solid shape. The disc form of the two magnets 65, 70 is then more particularly, according to this embodiment, a plate shape.

The axis and the field of the magnets are aligned along the axis A-A. The magnets 65 and 70 are for example ferrite magnets.

The stack 63 also includes a metallic central core of revolution of axis A-A denoted 75 placed between the magnets 65 and 70, in contact therewith. The central core 75 laterally forms a pole of the magnetic circuit opposite the shell 55 and delimits an air gap 77 with this shell 55 in which the central winding section 31 extends. At rest, the central winding section 31 alone forming the spool 25 extends opposite the central core 75.

The stack 63 includes two metal discs 80, 85 with axis of revolution A-A. An aperture passes through the two discs 80, 85, for example along the axis A-A. The two metal discs 80, 85 are then comparable to rings. In a variant that is not shown, the two metal discs 80, 85 are solid. The two metal discs 80, 85 are then comparable to plates.

The first metal disc 80 is placed between the magnet 65 and the membrane 35, in contact with the magnet 65. The magnet 70 is located between the second metal disc 85 and the central core 75, in contact therewith. The metal discs 80, 85 define, with the casing 52, two air gaps 86, 87, hereinafter called end air gaps, of the magnetic circuit.

The metal discs 80, 85 are surrounded by the collars 61, 62 of the casing with which they form the two end air gaps 86, 87 of the magnetic circuit.

The frame 3 includes a central pillar 90 in contact with the second metal disc 85, on the side opposite the second magnet 70. The central pillar 90 is for example a part made from stamped steel. The central pillar 90 has a vase shape, the end in contact with the second metal disc 85 forming a collar of widening outer diameter substantially similar to that of the second magnet. The central pillar 90 comprises a shoulder 91 of narrowing diameter at its opposite end.

The frame 3 also includes a flared case 93, commonly called basket assembly, extending the first shell 55 on the side of the membrane 35. The flared case 93 widens in a direction opposite the first shell 55 and receives the membrane 35 at its open end of larger diameter.

The speaker according to the invention comprises a guide element of the mobile equipment on the side of the membrane 35, consisting of a suspension 105 in the form of an O-ring. The suspension 105 is connected on the one hand to the end of large diameter of the flared case 93 and on the other hand to the periphery of the membrane 35, the membrane being surrounded by the suspension. In section, the suspension is Ω-shaped.

The suspension 105 is for example glued on the one hand to the flared case 93 and on the other hand to the membrane 35.

A complementary guide element 110 is arranged on the side opposite the membrane 35 relative to the magnetic circuit 4. It is formed by a wave seal. This type of seal is also called "spider." In embodiments that are not illustrated, the complementary guide element 110 is formed by a suspension in the form of an O-ring, for example having an Ω-shaped section. The general shape of the complementary guide element 110 is then similar to the general shape of the suspension 105.

The complementary guide element 110 is in contact on the one hand with the central pillar 90 and on the other hand with the divergent 45. The complementary guide element is in contact with the wide end of the divergent 45 and in contact with the shoulder 91 of the central pillar. The complementary guide element 110 is for example glued with the divergent 45 and with the central pillar 90.

The frame 3 includes a protective cap 115 of the complementary guide element 110, connecting the free base of the pillar 90 to the casing 52 by surrounding the complementary guide element 110. Its diameter and its length allow the travel of the complementary guide element 110 and of the mobile equipment 5 during the operation of the speaker 1.

Electrical lead wires 117, 118 are connected on either side of the spool 25. The protective cap 115 on the one hand and the flared case 93 on the other hand each include a passage hole 120, 125 for the lead wires 117, 118, emerging on either side of the spool holder. The spool 25 thus consists of an odd number of layers of wires.

A supply on either side of the spool 25 allows a spool to be obtained that includes an odd number of layers of wires. In a variant, for an even number of layers of wires in the spool 25, the lead wires emerge on the same side of the spool. The protective cap 115 then includes two passage holes for the lead wires 117, 118.

The magnetic field generated by the magnets in opposition 65 and 70 is conducted by the magnetic circuit 4. The magnetic flux is of opposite direction in the central air gap 77 and in the air gaps 86 and 87. Thus, the electromagnetic force on the mobile equipment 5 generated by a current circulating in the central winding section 31 is of opposite direction in the air gaps 86 and 87 relative to the force generated by this same current in the central air gap 77. The more the central winding section 31 moves away from the central air gap 77, the more the amplitude of the electromagnetic force generated by the magnetic flux of the central air gap 77 decreases and the more the amplitude of the electromagnetic force generated by the flux of one of the air gaps 86 and 87 increases. This forms magnetic braking of the mobile equipment 5.

The suspension 105 and the complementary guide element 110 are both attached on the one hand on the frame 3 and on the other hand on an element of the mobile equipment 5. The guide elements hold the mobile equipment 5 at both of its ends, on either side of the magnetic circuit 4. This position of the guide elements on the mobile equipment 5 allows guiding of the movement of the mobile equipment 5 so as to allow displacement primarily in translation parallel to the axis A-A and to prevent any rotation of the mobile equipment 5 relative to the rest of the speaker 1.

Figure 2:
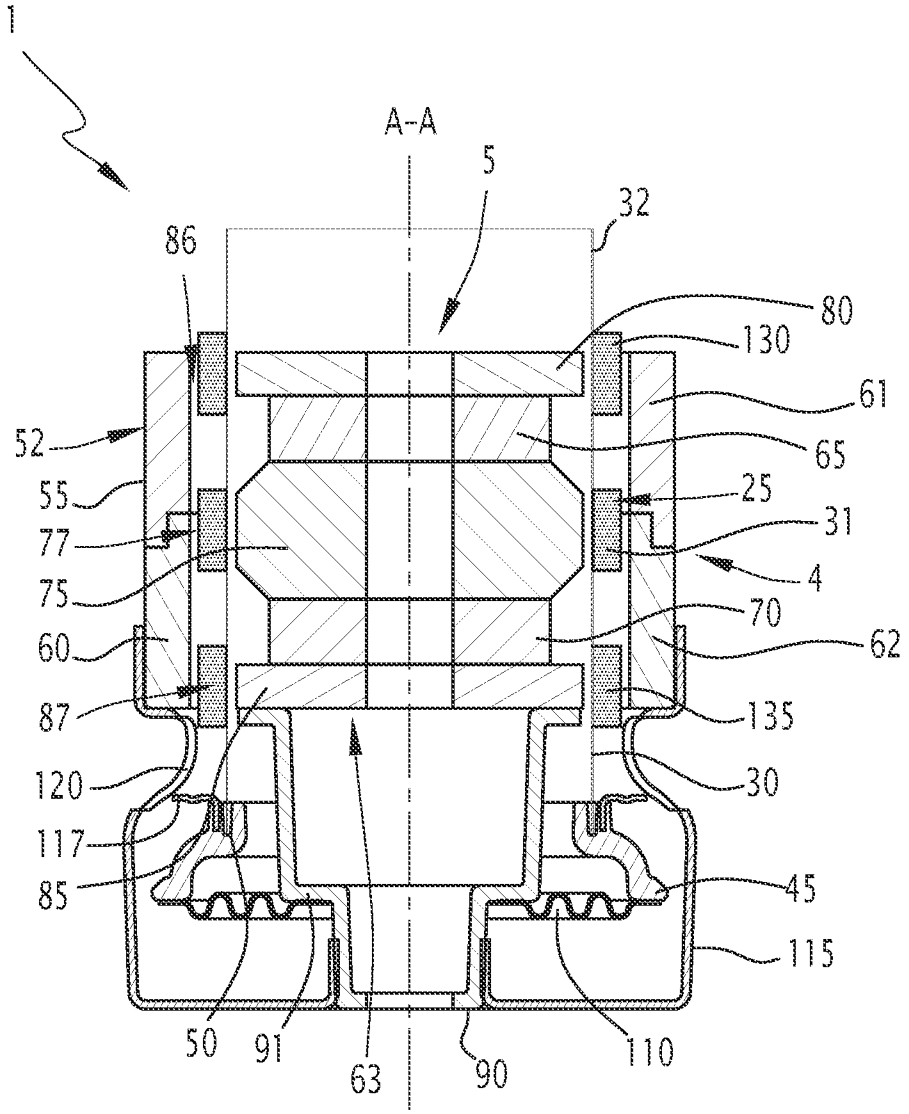
FIG. 2 is a partial sectional view of a speaker according to a second embodiment of the invention.

FIG. 2 shows a detail of a second embodiment of the speaker 1. This embodiment differs from the first embodiment only as follows. Similar elements bear the same references.

In this embodiment, the spool 25 comprises, in addition to the central winding section 31, two end winding sections 130, 135.

Like the central winding section 31, the end winding sections 130, 135 are formed by a winding of at least one contact line, wound around the spool holder 30 and distributed over one or several layers. The central winding section 31 and the end winding sections 130, 135 are for example formed by the same contact line, the sections for example being connected by unwound sections of the contact line.

The end winding sections 130, 135 each extend at rest through an end air gap 86, 87.

When the central winding section 31 is aligned with the central air gap 77, the end winding sections 130, 135 are each aligned with a respective end air gap 86, 87.

The winding direction of the end winding sections 130, 135 around the spool holder 35 is opposite the winding direction of the central winding section 31 around the spool holder 35. In other words, when the central winding section 31 is wound in a clockwise direction, seen from the side of the membrane 35, the end winding sections 130, 135 are wound in a counterclockwise direction, seen from the side of the membrane 35, and vice versa. Such a winding is particularly advantageous, since it allows the magnetic field circulating in the end air gaps 86, 87 and the casing 52 to be exploited by using a single signal in the spool 25. In FIG. 2, the shells 55, 60 are devoid of inner collars 61, 62 and the two magnets 65, 70 are radially withdrawn relative to the central core 75 and relative to the first 80 and second 85 metal discs. The second embodiment is, however, compatible with the shells 55, 60, with the magnets 65, 70, with the central core 75 and with the first 80 and second 85 metal discs of the first embodiment previously presented.

Figure 3:
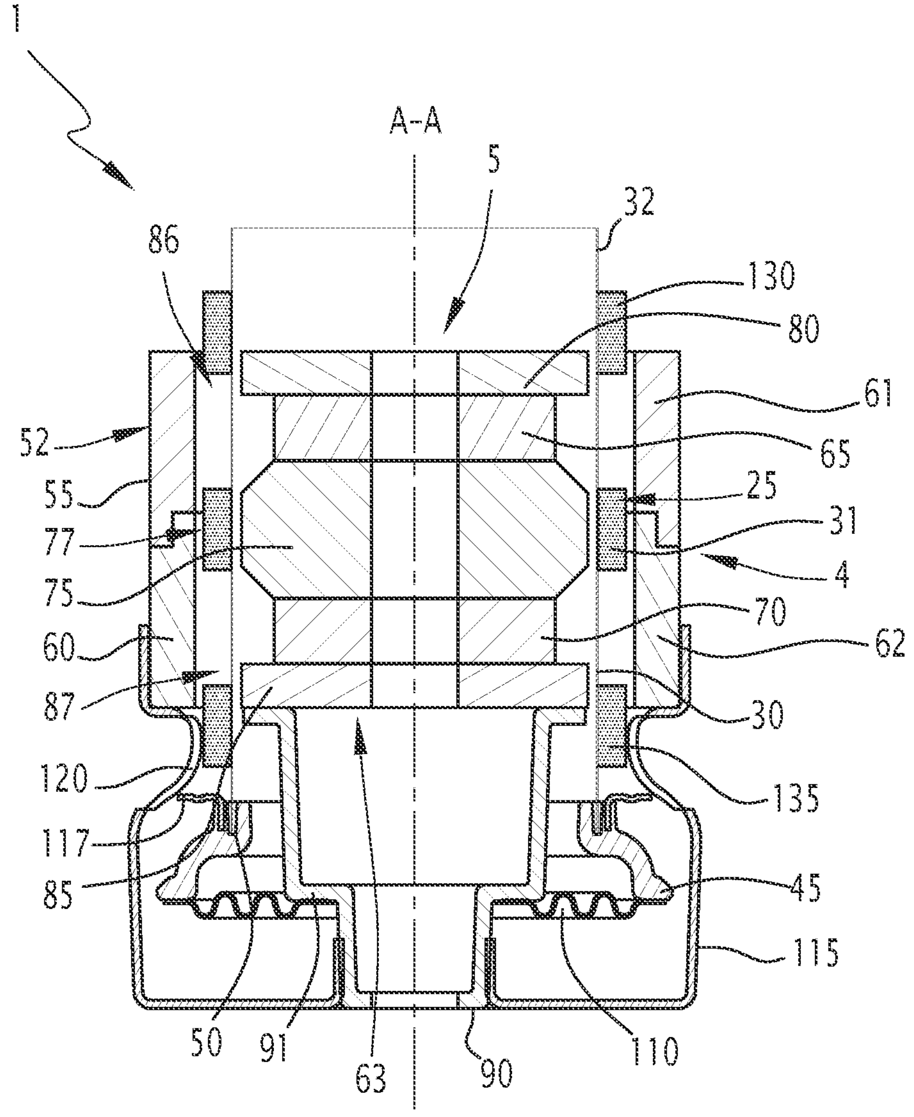
FIG. 3 is a partial sectional view similar to that of FIG. 2 of a speaker according to a third embodiment of the invention.

FIG. 3 shows a detail of a third embodiment of the speaker 1. This embodiment differs from the second embodiment only as follows. Similar elements bear the same references.

According to this embodiment, end winding sections 130, 135 are offset at rest, along a direction parallel to the axis A-A, toward the outside of the end air gaps 86, 87.

As shown in FIG. 3, the end winding sections 130, 135 are for example both offset away from the central core 75 relative to the air gaps 86, 87. In other words, when the central winding section 31 is aligned with the central air gap 77, the end winding sections 130, 135 are offset from the end air gaps 86, 87 away from the central core 75. Here, "offset" means that the median planes of the end winding sections 130, 135 are offset relative to the median planes of the air gaps 86, 87, the end winding sections 130, 135 for example extending at least partially, however, in the air gaps 86, 87. Such an offset is particularly advantageous, since it makes it possible to ensure linearity of the electromagnetic force applied by the spool 25 on the spool holder 30, the sum of the spool section surfaces in the air gaps 77, 86 and 87 being substantially constant, irrespective of the position of the mobile equipment 5.

In the second and third embodiments, the expanse along the axis A-A of the end winding sections 130, 135 is for example different from the expanse of the central winding section 31, and for example greater than the expanse of the central winding section 31 (not shown in FIGS. 2 and 3).

In the second and third embodiments, the number of layers of wound wire forming the first 130 and second 135 end winding sections is for example different from the number of layers forming the central winding section 31, and for example less than the number of layers forming the central winding section 31 (not shown in FIGS. 2 and 3).

Figure 4:
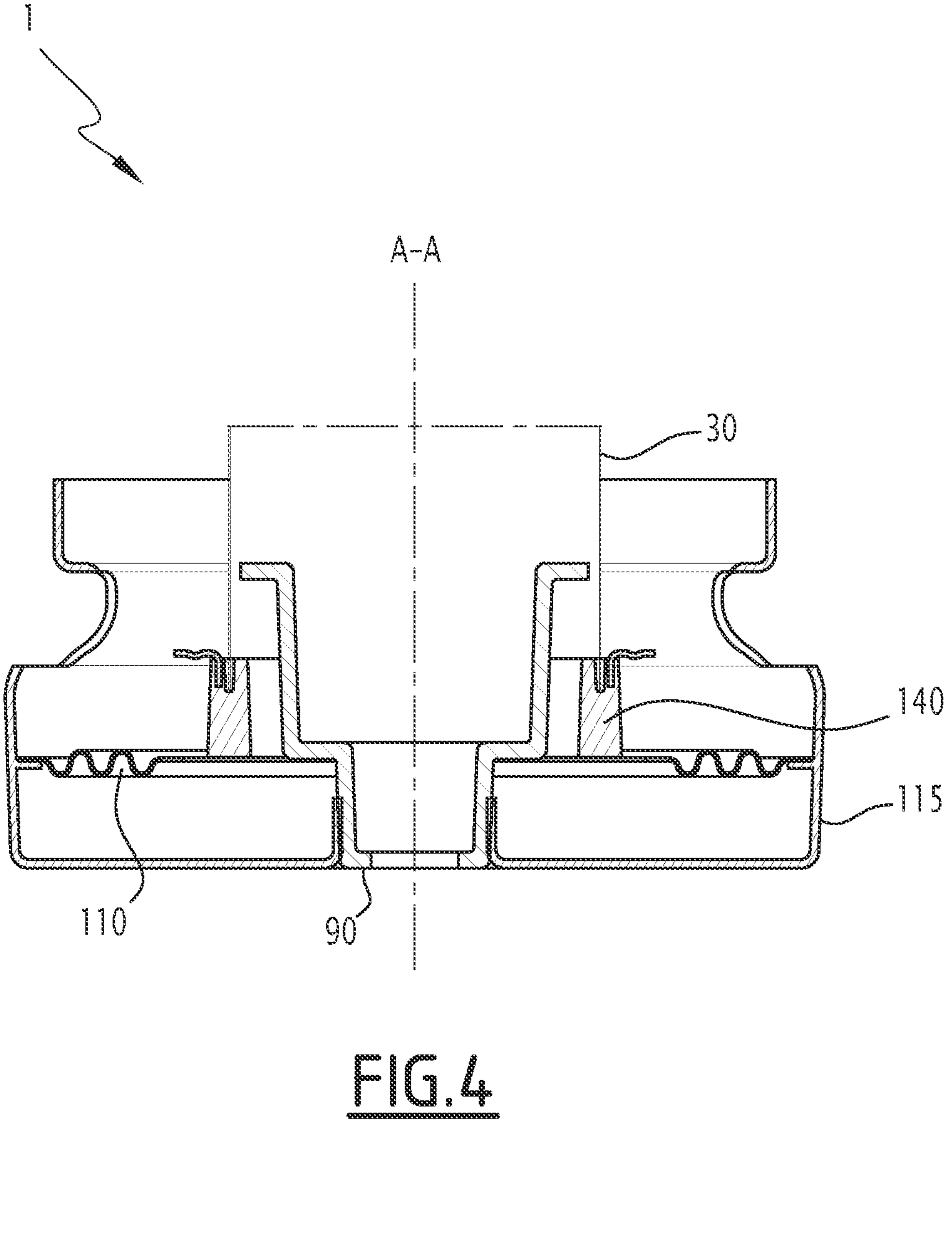
FIG. 4 is a partial sectional view different from that of FIGS. 2 and 3 of a speaker according to a variant of the invention.

FIG. 4 shows a detail of a variant of the speaker 1, compatible with any of the first, second and third embodiments previously described. This variant differs from the variants of the first, second and third embodiments only as follows. Similar elements bear the same references.

The mobile equipment 5 comprises a connecting section 140 in place of the divergent 45. The connecting section 140, like the divergent, extends the tubular main body 32 of the spool holder, has a shape of revolution of axis A-A and is for example formed from injected plastic. It comprises a groove, and the main tubular body 32 of the spool holder is embedded in the connecting section 140.

In the example of FIG. 4, the connecting section is tubular.

According to the variant of FIG. 4, the complementary guide element 110 is in contact on the one hand with the protective cap 115 and on the other hand with the connecting section 140. Unlike the variant of the embodiment shown in FIG. 1, where the complementary guide element 110 extends radially toward the inside of the mobile equipment 5, the guide element 110 extends, in the variant shown in FIG. 4, radially toward the outside of the mobile equipment 5.

The invention claimed is:

1. A speaker comprising a frame comprising a magnetic circuit having on the one hand an external metal casing that is toroidal about an axis and on the other hand a stack comprising a metallic central core placed between a first magnet and a second magnet, with polarities of opposite directions along the axis, aligned along this same axis and themselves placed between a first metal disc and a second metal disc, the central core and at least one disc delimiting an air gap with the casing, the speaker comprising mobile equipment that is movable relative to the magnetic circuit along the axis, the mobile equipment including a spool holder bearing a spool and a membrane, the spool holder being mounted movably through the air gaps, the speaker including a first guide element of the mobile equipment arranged between the mobile equipment and the frame on the side of the membrane relative to the magnetic circuit;

wherein each metal disc delimits, with the casing, an end air gap, the mobile equipment passes all the way through the magnetic circuit through the end air gaps and the speaker includes an additional guide element, arranged between the mobile equipment and the frame, on the side opposite the membrane relative to the magnetic circuit.

2. The speaker according to claim 1, wherein the spool comprises a central winding section and two end winding sections, the end winding sections extending at rest each at least partially through an end air gap.

3. The speaker according to claim 2, wherein when the central winding section is aligned with the central air gap, the end winding sections being offset from the end air gaps at a distance from the central core.

4. The speaker according to claim 1, including a protective cap secured to the metal casing and which surrounds the complementary guide element.

5. The speaker according to claim 1, including a central pillar extending the stack on the side opposite the membrane, the complementary guide element being connected to the central pillar.

6. The speaker according to claim 1, wherein the mobile equipment includes, at its end opposite the membrane, a divergent, the section of which increases at its end opposite the membrane, the complementary guide element being connected to the end of large diameter of the divergent.

7. The speaker according to claim 1, wherein the metal casing includes a first shell and a second shell, which are coaxial, arranged end to end in the extension of one another.

8. The speaker according to claim 1, wherein the spool is extended by lead wires circulating through air gaps delimited by the two metal discs.

9. The speaker according to claim 1, wherein the inner diameter of the casing along any plane perpendicular to the axis is smaller at its two ends than in its central region.

10. An audio device, comprising a speaker according to claim 1.

* * * * *